United States Patent [19]

Schrodl et al.

[11] Patent Number: 5,796,235
[45] Date of Patent: Aug. 18, 1998

[54] PROCESS AND CIRCUITS FOR DETERMINING MACHINE-RELATED ELECTRO-MAGNETIC AND MECHANICAL STATE VARIABLES ON ELECTRODYNAMIC INDUCTION MACHINES SUPPLIED VIA CONVERTERS

[76] Inventors: Manfred Schrodl, Untere Hauptstrasse 76, A-7223 Sieggraben, Austria; Richard Ensbacher, An den Eisteichen 24, A-1120 Vienna, Austria

[21] Appl. No.: 456,849

[22] PCT Filed: Apr. 8, 1992

[86] PCT No.: PCT/AT92/00049

§ 371 Date: Nov. 2, 1993

§ 102(e) Date: Nov. 2, 1993

[87] PCT Pub. No.: WO92/19038

PCT Pub. Date: Oct. 29, 1992

Related U.S. Application Data

[63] Continuation of Ser. No. 129,118, Nov. 2, 1993, abandoned.

[30] Foreign Application Priority Data

| Apr. 11, 1991 | [AT] | Austria | 766/91 |
| Apr. 19, 1991 | [AT] | Austria | 823/91 |
| Oct. 11, 1991 | [AT] | Austria | 2027/91 |
| Oct. 18, 1991 | [AT] | Austria | 2076/91 |
| Apr. 7, 1992 | [AT] | Austria | 724/92 |

[51] Int. Cl.$^6$ ............................................. H02P 5/34
[52] U.S. Cl. ................... 318/801; 318/701; 318/254
[58] Field of Search ................... 318/700–724, 318/798–811

[56] References Cited

U.S. PATENT DOCUMENTS

| 4,240,020 | 12/1980 | Okuyama et al. | 318/722 X |
| 4,267,499 | 5/1981 | Kurosawa | 318/800 |
| 4,268,781 | 5/1981 | Kawada et al. | 318/432 |
| 4,400,655 | 8/1983 | Curtiss et al. | 318/729 |
| 4,611,157 | 9/1986 | Miller et al. | 318/696 |
| 4,642,543 | 2/1987 | MacMinn | 318/696 |
| 4,767,976 | 8/1988 | Mutoh | 318/808 |
| 4,780,650 | 10/1988 | Miyazaki et al. | 318/798 X |
| 4,961,038 | 10/1990 | MacMinn | 318/696 |
| 5,003,243 | 3/1991 | Tadakuma et al. | 318/800 |
| 5,166,593 | 11/1992 | De Doncker et al. | 318/800 |
| 5,296,793 | 3/1994 | Lang | 318/721 X |

FOREIGN PATENT DOCUMENTS

| 1273686 | 7/1968 | Germany. |
| 3820125 | 12/1988 | Germany. |
| WO90/12278 | 10/1990 | WIPO. |

OTHER PUBLICATIONS

IEEE Transactions On Industrial Electronics And Control, vol. 38, No. 2, Apr. 1991, New York, NY. pp. 95–100 (Sanjib Kumar Panda and Gehan Amaratunga), "Comparison of Two Techniques for Closed-Loop Drive of VR Step Motors Without Direct Rotor Position Sensing".

Fourth International Conference On Power Electronics And Variable Speed Drives, Jul. 17, 1990, London, United Kingdom, pp. 249–252 (N.H. Mvungi et al.), "A New Sensorless Position Detector for SR Drives".

etzARCHIV, vol. 12 (1990), No. 11, pp. 349–351 (Manfred Depenbrock et al.), "Determination of the Stator Flux Space Vector of Saturated AC Machines".

(List continued on next page.)

Primary Examiner—David S. Martin
Attorney, Agent, or Firm—Greenblum & Bernstein P.L.C.

[57] ABSTRACT

Method and apparatus for accurately determining electromagnetic and mechanical information from electrodynamic rotary field machines, such as, for example, asynchronous, synchronous or reluctance machines that utilize voltage discontinuities generated by an associated inverter. The apparatus according to the present invention obtains information from machines running at a low rpm without using a mechanical transducer, as well as with machines running at a high rpm.

27 Claims, 3 Drawing Sheets

OTHER PUBLICATIONS

Dissertation entitled "Entwurf und Aufbau eines nichtlinearen Zustands–und Parameterbeobachters für transient betriebene Asynchromaschinen" [Design and construction of a nonlinear status and parameter observer for transien–operation asynchronous machines], by Manfred Schrödl of the Technische Universität Wien [Technical University of Vienna], 1987, p. 14 +.

A chapter entitled "Algorithmus zur rechnerischen Erfassung der Polradlage einer permanent–magneterregten Synchromaschine ohne Lagegeber" [Algorithm for computer detection of the magnet wheel position of a permanent–magnet–excited synchronous machine without position transducer], by M. Schrödl and T. Stefan, in the Proceedings (pp. 48 –54) of the ETG/VDE Conference, Antriebssysteme für die Geräte–und Kraftfahrzeugtechnik [Drive systems for the equipment and automotive industry], held in Bad Nauheim, Germany, in 1988.

A chapter entitled "Detection of the rotor position of a permanent magnet synchronous machine at standstill", by M. Schrödl, included in the proceedings published for the International Conference on Electrical Machines in Pisa, Italy in 1988.

Dissertation entitled "Die permanenterregte umrichtergespeiste Synchronmaschine ohne Polradgeber als drehzahlgeregelter Antrieb" [The permanently excited inverter–spplied synchronous machine without magnet wheel transducer, as an rpm–regulated drive], by H. Vogelmann of the University of Karlsruhe, Germany, 1986.

An article entitled "PWM–Based Position Sensorless Control of Variable Reluctance Motor Drives", by Michael G. Egan et al., in the Proceedings of the EPE–European Power Electronics Conference in Florence, Italy, 1991, pp. 4–024 to 4–029.

An article entitled "A Torque Angle Calculator for Sensorless Reluctance Motor Drives", by Silverio Bolognani, in the Proceedings of the EPE–European Power Electronic Conference in Florence, Italy, 1991, pp. 4–013 to 4–017.

An article entitled "Accurate Sensorless Rotor Detection in an SR Motor", by N.M. Mvungi et al., in the Proceedings of the EPE–European Power Electronic Conference in Florence, Italy, 1991, pp. 1–390 to 1–393.

PROCESS AND CIRCUITS FOR DETERMINING MACHINE-RELATED ELECTRO-MAGNETIC AND MECHANICAL STATE VARIABLES ON ELECTRODYNAMIC INDUCTION MACHINES SUPPLIED VIA CONVERTERS

This application is a continuation, of application Ser. No. 08/129,118, filed Nov. 2, 1993, now abandoned.

BACKGROUND OF THE INVENTION

1. Field of the Invention

The present invention is directed to a method and arrangement for determining machine-specific electromagnetic and mechanical status variables for electrodynamic rotary field machines supplied via inverters, such as, for example, asynchronous machines, synchronous machines and reluctance machines.

2. Discussion of Background and Relevant Information

Due to progress made in the field of power and information processing electronics, inverter supplied asynchronous, synchronous and reluctance machines are gaining increasing significance in drive technology.

Asynchronous machines are distinguished from synchronous machines and direct current machines by their greater sturdiness and lower production costs. When performing closed-loop control algorithms for dynamically high-quality field-oriented control concepts, the necessity arises, at low rpm of the asynchronous machines, of having a mechanical transducer detect the rotor position or rotor speed. Asynchronous machines can be dynamically operated without the use of position transducers and tachometers if the rpm exceeds a certain minimum predetermined value, in which case, the magnetic flux can be calculated from electrical variables from an induced voltage. However, this has not yet been successfully achieved when the asynchronous machine is operating in the low rpm range. Thus, ongoing research is attempting to replace mechanical transducers with mathematical models and/or to utilize physical phenomena.

An article at pages 349-351 of "etzARCHIV", No. 11, Vol. 12 (1990), entitled "Determination of the Stator Flux Space Vector of Saturated AC Machines" addresses these problems. The article describes a method in which an alternating current machine that is supplied via a pulse-width modulated alternating converter stage, carries out a real-time determination of the stator voltage vector once each oscillation period. According to this method, measurement errors in the values of the phase currents and phase voltages needed for the calculations can be kept small. Thus, there is no need for obtaining rotor speed measurements.

One disadvantage of this method is that inductances are calculated. Thus, voltage measurements need to be constantly obtained.

In a dissertation entitled "Entwurf und Aufbau Eines Nichtlinearen Zustands—Und Parameterbeobachters Für Transient Betriebene Asynchronmaschinen" [Design and Construction of a Nonlinear Status and Parameter Observer for Transient Operation Asynchronous Machines], by Manfred Schrödl (Technische Universität Wien [Technical University of Vienna], 1987, page 14f.), the author discusses how to determine a rotor flux from a stator equation in a rotary current machine. According to the dissertation, a "voltage model" is used as an aid, which is based on a formula:

$$\psi_R = \frac{X_R}{X_H} \cdot (\underline{u}_s - \underline{i}_s - \pi_s - \delta' X_s \underline{i}_s)$$

in which the symbols have the following meanings:

- $\psi_R$ ... rotor flux space vector
- $X_R$ ... specific reactants
- $X_N$ ... specific primary field reactance
- $\underline{u}_s$ ... stator voltage space vector
- $\underline{i}_s$ ... stator current space vector
- $\pi_s$ ... specific stator resistance
- $\delta'$ ... stray coefficient
- $X_s$ ... specific stator reactance
- • ... derivation over time.

According to this model, the flux can be determined solely by measuring electrical variables, eliminating the need for an electrical transducer. Additionally, when voltage space vector amounts are high—which is equivalent to a high rpm—the current-dependent terms, especially at a low load, only weakly influence the flux value. Accordingly, a good accuracy can be expected in these operating ranges.

A disadvantage of such a measuring method is that the influence of measurement errors and temperature-dependent stator resistance, and in the case of an analog construction, the drift of the integrators, increasingly worsen the quality of the model because of the lack of any feedback.

Synchronous machines have become popular because of improvements in the field of magnetic materials. Compared with asynchronous machines, synchronous machines have a simpler structure in terms of closed-loop control technology, and, because of very low rotor losses, operate with a higher efficiency as compared to asynchronous machines.

In order to carry out the control algorithms in dynamically high-quality field-oriented closed-loop concepts (or magnet-wheel-oriented closed-loop control concepts), a mechanical transducer must be employed that detects the magnet wheel position. Efforts have been made to replace the mechanical transducer with mathematical models or to utilize physical phenomena.

Several methods have been introduced with which the position of the magnet wheel of a permanent-magnet-excited synchronous machine can be detected.

One such method is described by M. Schrödl and T. Stefan at pages 48–54 of the Proceedings of the ETG/VDE Conference, entitled "Antriebssysteme Für Die Gerate und Kraftfahrzeugtechnik" [Drive Systems For the Equipment and Automotive Industry], held in Bad Nauheim, Germany, in 1988. Pages 48–54 of this publication pertain to a chapter entitled "Algorithmus Zur Rechnerischen Erfassung Der Polradlage Einer Permanentmagneterregten Synchronmaschine Ohne Lagegeber" [Algorithm for Computer Detection of the Magnet Wheel Position of a Permanent Magnet Excited Synchronous Machine Without Position Transducers], describe the magnet wheel position being detected in non-salient-pole machines by evaluating an induced voltage. Beyond a certain mechanical rpm, a permanent magnet excited rotor can be used as a position transducer, as a voltage space vector induced in a stator winding generally has an unequivocal relationship with the rotor position sought. Even non-sinusoidal induction distributions in an air gap can be allowed. This induced voltage space vector can be calculated from the terminal voltages, taking resistance and inductive voltage drops into account.

A disadvantage of this system is the fact that the evaluation cannot be done until the machine is beyond a certain minimum rpm. since the induced voltage space vector amount decreases in proportion with the rpm.

An article entitled "Detection of the Rotor Position of a Permanent Magnet Synchronous Machine at Standstill" by M. Schrödl, published in the Proceedings for the International Conference on Electrical Machines in Pisa, Italy in 1986, reports on another method. In this method, electrical measurement signals are measured by varying a magnetic saturation brought about by the permanent magnet. Since this type of measurement can be reproduced, the rotor position can be exactly defined. The knowledge of the polarity of the magnets, which is necessary to carry out the measurement, can be ascertained by varying the magnetic operating point and measuring its effect on the impedance. This makes the investigation of the rotor position possible even with the machine at a standstill. However, this method is very complicated and expensive, due to the necessity of having an additional analog current source.

A dissertation entitled "Die Permanenterregte Umrichtergespeiste Synchronmaschine Ohne Polradgeber Als Drehzahlgeregelter Antrieb" [The Permanently Excited Inverter Supplied Synchronous Machine Without Magnet Wheel Transducer As An RPM-Regulated Drive] by H. Vogelmann (University of Karlsruhe, Germany, 1986) discusses a method for locating a magnet wheel position. According to this disclosure, a relatively high-frequency current, generated by an inverter, is superimposed as a test signal on an actual useful signal. The fundamental concept is that an electric alternating signal imposed in a certain direction (space vector) generally causes a reaction in an orthogonal direction, due to different inductances in a longitudinal and transverse axis. Only when the alternating signal is precisely imposed in the longitudinal or transverse direction of the rotor does such coupling not occur. This provides a criterion as to whether or not the signal is being applied in the intended, specified direction.

A prerequisite for attaining an exact measurement is to employ a permanent magnet excited synchronous machine having a salient-pole character. In other words, a synchronous machine must be used having unequal inductances in the longitudinal and transverse directions, as in the case of flux-concentrating arrangements.

However, permanent magnet excited synchronous machines are generally not manufactured in a flux-concentrating version. Rather, they are manufactured using a simple constant air gap in which magnets are glued to the surface of the rotor. Such a construction enables air gap inductions of approximately one Tesla, when high-quality samarium-cobalt (or neodymium-iron) magnets are employed.

Accordingly, the above-discussed locating methods provide usable results only when the machines have a pronounced salient-pole characteristic.

Reluctance machines are distinguished from electrically or magnetically excited synchronous and direct current machines, by their greater sturdiness. In the reluctance machines, if the control algorithms are to be carried out by dynamically high-quality field-oriented or rotor-oriented closed-loop control concepts, it becomes necessary to use a mechanical transducer to detect the rotor position or rotor speed. This requirement reduces the sturdiness of the machine, and increases its cost. As in the case of the other types of rotary field machines, much research work is being directed to replacing the mechanical transducer with mathematical models and/or utilizing physical phenomena.

An article appearing at pages 4-024 to 4-029 of the Proceedings of the EPE—European Power Electronics Conference in Florence, Italy, 1991, entitled "PWM—Based Position Sensorless Control of Variable Reluctance Motor Drives" discusses a sensorless rotor position detection method that can be used with reluctance machines. This method, which can be used only with so-called switched reluctance motors, performs a frequency analysis with a special pulse width modulation control. By dividing voltages and currents prepared by filters and integrators, a conclusion is drawn as to the rotor position dependent inductance of a winding that is carrying current at a particular moment.

However, this method cannot be used with a conventional stator with rotary current windings. Moreover, this method requires both a voltage measurement and a special pulse width modulation.

This same article makes reference to a document (reference 6; entitled "Mutual inductance effects"), which addresses a method in which the rotor position of a reluctance motor is ascertained by means of a supervisory microcontroller. However, this method requires that a voltage measurement be carried out in order to detect the rotor position.

In another article appearing at pages 4-013 to 4-017 of the Proceedings of the EPE—European Power Electronics Conference in Florence, Italy, 1991, entitled "A Torque Angle Calculator for Sensorless Reluctance Motor Drives", a method is proposed for a sensorless rotor position detection in reluctance machines. The point of departure for this method is chosen such that it can be achieved only in the event that all the derivations over time are ignored.

A problem with this method is that it only functions in steady state (or quasi-steady state) operations. Additionally, this method requires that a voltage measurement be performed.

Pages 1-390 to 1-393) of the Proceedings of the EPE—European Power Electronics Conference in Florence, Italy, 1991, entitled "Accurate Sensorless Rotor Position Detection in an SR Motor", discloses a method for making a positional determination of a reluctance motor using test signals. The same method is also described in an article entitled "A New Sensorless Position Detector for SR Drives" published at pages 249–252 of Conference Publication No. 324 of the Fourth International Conference, Power Electronics and Variable Speed Drives, London, 1991. Compared with the methods discussed above, this method has the advantage that it can be used not only with switched reluctance machines, but also with machines having a normal rotary current winding in the stator.

The operating principle of this method is that in an SR motor, there are always motor phases in which there is no operating current flowing for a certain period of time. During that period, a test voltage pulse is impressed. On the one hand, the flux linking of this winding is ascertained by an integration of the test voltage, while on the other hand, the course of current in the winding is measured. If the current reaches a certain value, the instantaneous flux linking is measured, and the corresponding rotor position is ascertained from a table.

However, this method does not function with rotary current windings. Moreover, this method requires the taking of a voltage measurement.

Further, text books disclosing equations for introducing complex quantities based on space vector theory, see, e.g., Kovacs, "Transient Phenomena in Electrical Machines," Elsevier, pp. 14–17 (1984), are well known to the ordinarily skilled artisan, as well as text books disclosing equations in which modulation of an inductance having double the rotor angle is determined, see, e.g., Concordia, "Synchronous Machines," General Electric Series, pp. 10 and 11 (1951).

SUMMARY OF THE INVENTION

Figure 1:
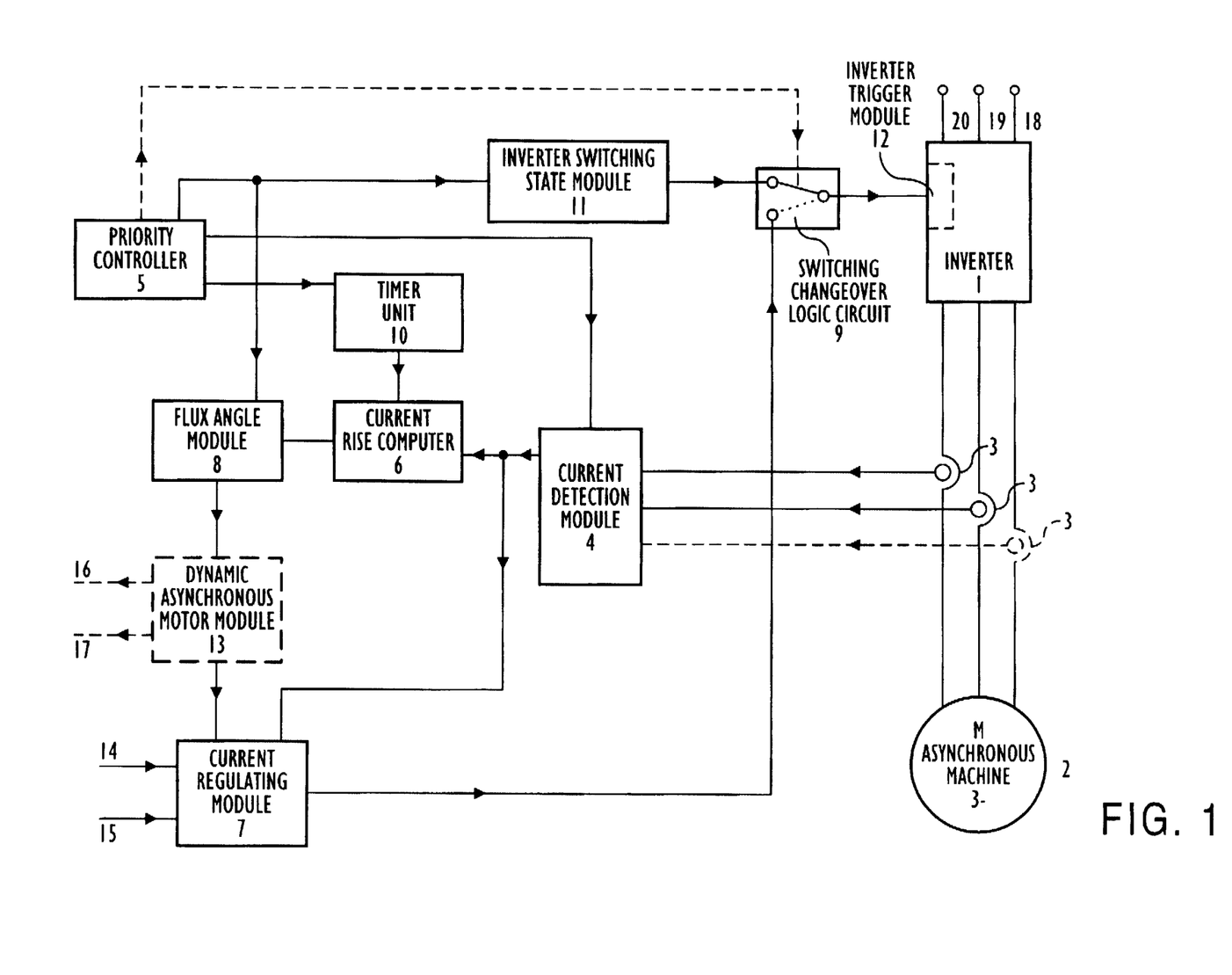
FIG. 1 illustrates the present invention applied to an asynchronous machine.
Figure 2:
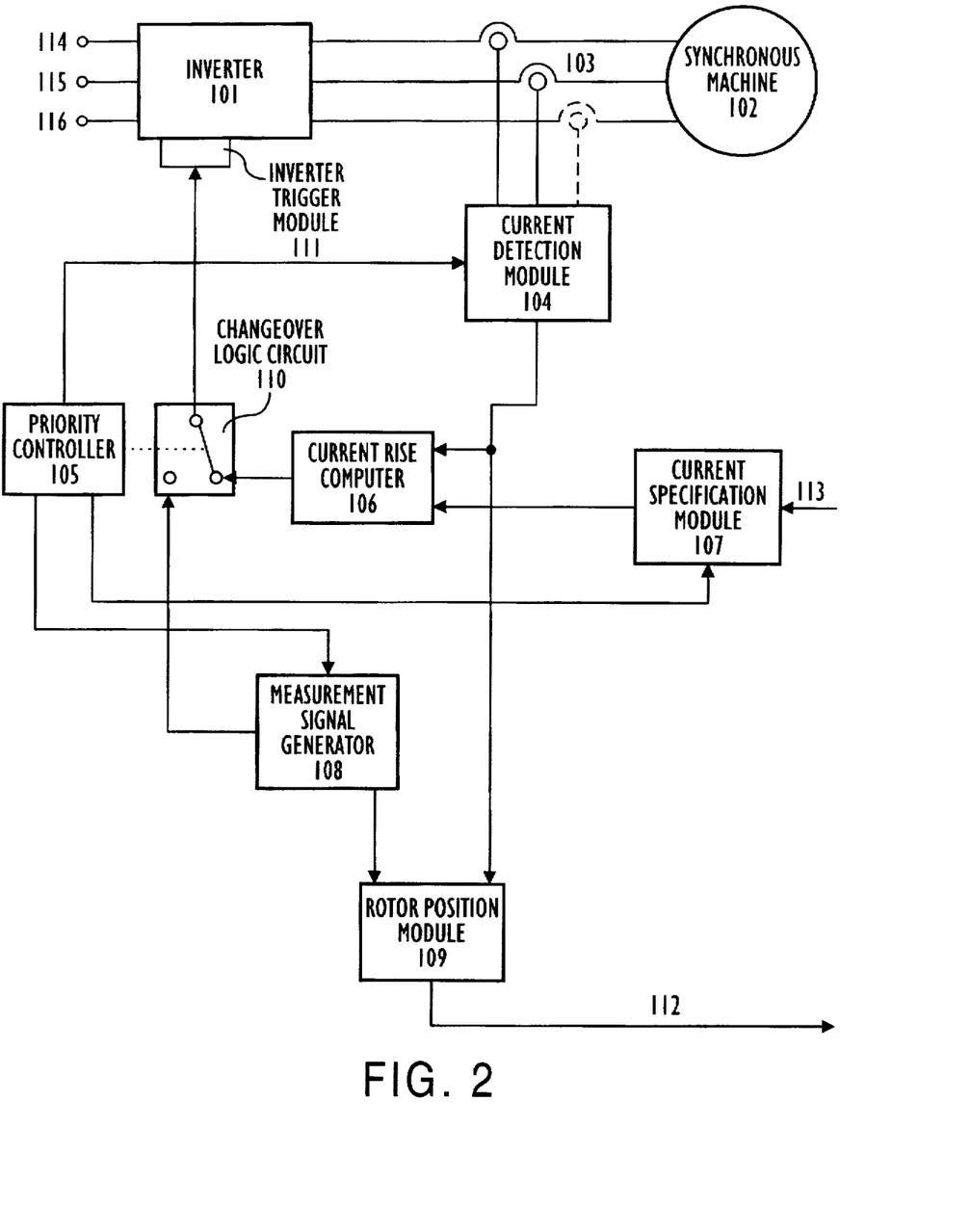
FIG. 2 illustrates the present invention applied to a synchronous machine.
Figure 3:
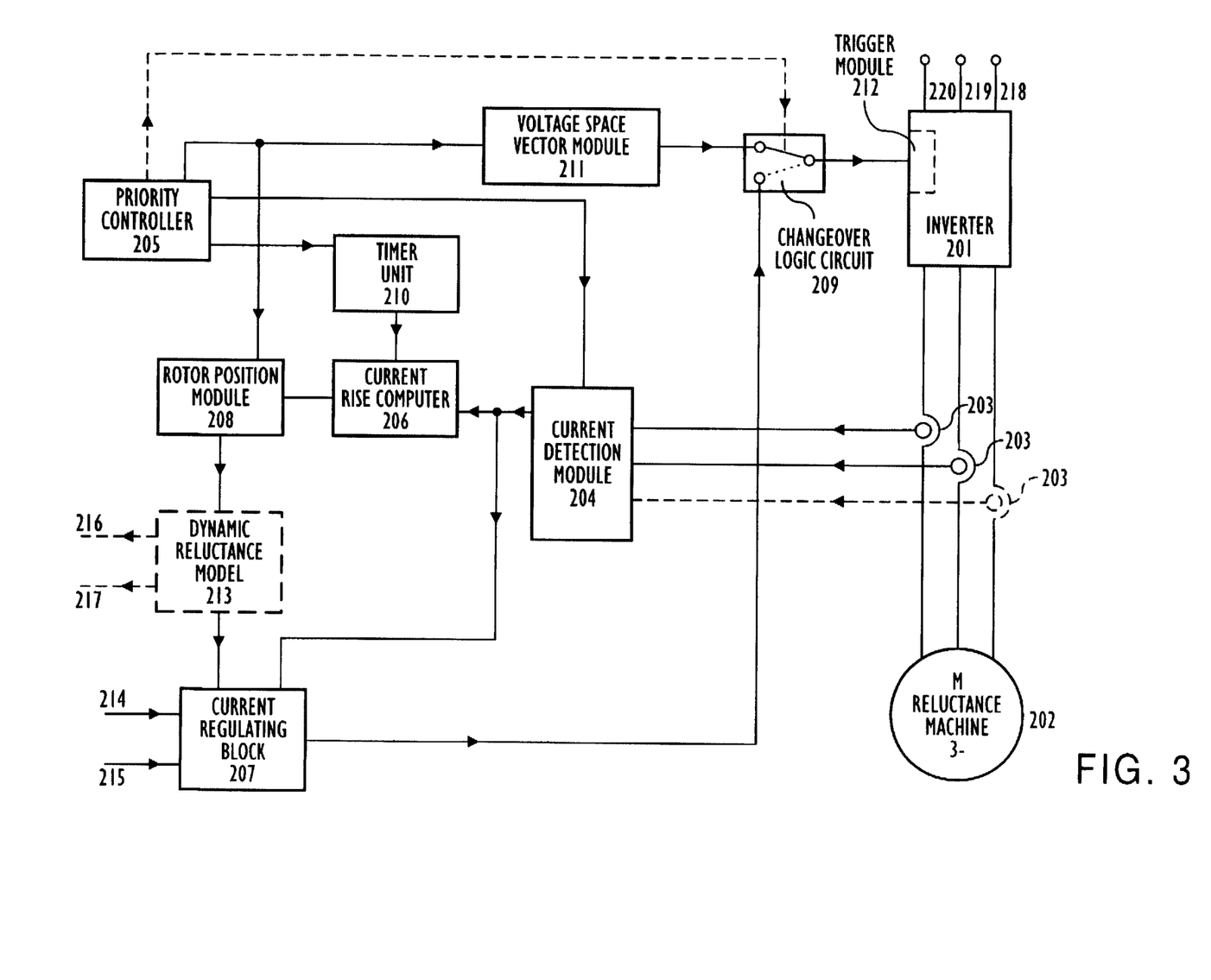
FIG. 3 illustrates the present invention applied to a reluctance machine.

Accordingly, an object of the present invention is to develop a method for determining machine specific electromagnetic and mechanical status variables in electrodynamic rotary field machines by only measuring electrical variables, (especially currents; however, no phase voltages are required, as shown in FIGS. 1–3); and in the process, avoiding the disadvantages or inaccuracies of the known methods described above.

According to an embodiment of the present invention, an induction machine, such as, for example, an asynchronous machine, is magnetized prior to the beginning of a measurement, and feedback from the measurement signals are transferred to the asynchronous machine and measured. The measurement signals comprise voltage discontinuities generated by an inverter which cause current variations that are measured and delivered to a computer to ascertain a complex parameter proportional to the quotient of a stator voltage space vector and a variation over time of a stator current space vector. A direction of the voltage space vector is derived from a known inverter trigger state, hereinafter called a complex parameter, and the magnetic flux is calculated. The complex parameter fluctuates in approximately a sinusoidal fashion in both its real component and its imaginary component, with twice the value of the magnetic flux angle, and twice the value of the magnetic flux angle sought being ascertained by known methods of complex calculation from real and imaginary components.

An advantage of the method of the instant invention resides in it being able to operate at low rpm without the use of a mechanical transducer. The instant invention is not vulnerable to uncertainties in the rotor resistance parameter; accordingly, voltage measurements can be dispensed with. Additionally, the instant invention does not need an additional analog current source. Instead, the already existing supplying inverter is used as the measurement signal generator.

An advantage of the present invention resides in the rotary field machine being embodied as an asynchronous machine.

According to the present invention, a circuit arrangement is provided in which actual current values of the phases of a stator winding of an asynchronous machine are obtained from current measuring devices disposed between an inverter and an asynchronous machine. The measured current values are inputted to a first input of a current detection module. A control output of a priority open-loop controller is connected to a control input of the current detection module. The output of the current detection module is connected to a first input of a current rise computer (i.e., a device for calculating a current change over time) and a field orientation and current regulating module. An output of the current rise computer is connected to a first input of a flux angle computer, while an output of the flux angle computer is connected to a second input of the field orientation and current regulating module. A command torque (or command magnetization) is delivered to a third and fourth input of the field orientation and current regulating module. The output of the field orientation and current regulating module is connected to a first input of a changeover logic circuit, while an output of a timer unit is connected to a second input of the current rise computer, and a third output of a priority controller is connected to an input of an inverter trigger status former and to a second input of a flux angle computer. The output of the inverter trigger status former is connected to a second input of the changeover logic circuit that is triggered by the priority controller. The output of the changeover logic circuit is connected to the input of a triggering module of the inverter.

With this circuit arrangement for a rotary field machine embodied as an asynchronous machine, the method of the present invention can be easily implemented in signal processors and microprocessors or controllers that are available on the market.

A further feature of the circuit arrangement of the present invention resides in that the connection between the flux angle computer and the field orientation and current regulating module is carried via a dynamic asynchronous motor model. The rpm (or load torque) is delivered and integrated from a first and second output, respectively, of the dynamic asynchronous motor model via a first and second line, respectively, to one or more superimposed closed-loop control circuits. The method of the present invention can be integrated into a multi-loop, closed-loop control system, such as, for example, rpm and torque control systems.

The method of the present invention is characterized, for a rotary field machine, in an embodiment as a synchronous machine, in that the determination of the rotor position is effected by means of the known methods of complex calculations by subtraction from two current rise measurements, in which the same voltage space vector is present in both partial measurements, and wherein the stator current space vectors, which are located at the mean during the two partial measurements, must be so different that the stator inductance, because of the different stator currents, perceptibly differs in the process. As a result, the measured difference between two current space vector variation speeds is a complex vector, whose real and imaginary components oscillate at a rotor circumferential speed, so that the argument of this complex vector is an unequivocal relationship with the electrical position of the rotor.

The advantage of the method of the present invention in its use with a synchronous machine resides not only in its great accuracy, but also in that no analog additional current sources are needed for the magnet wheel location. The already existing supplying current converter is used as the measurement signal generator. In this method, ambiguities in terms of the rotor determination are completely precluded.

A further advantageous feature of the present invention pertains to the rotary field machine acting as a synchronous machine.

In the context of the present invention, a circuit arrangement is provided wherein current variations necessary as a result of voltage discontinuities, and for calculating the variation over time of the current space vector amount, are taken from current measuring devices disposed between the current converter and the synchronous machine. Such an arrangement is characterized in that the actual currents from the output of a current detection module are delivered to both a first input of a rotor position computer and a first input of a current tracking device. The torque specification is delivered to a current specification module via a first input, and the output of the current specification module is connected to a second input of the current tracking device. A changeover logic circuit is triggered by a priority controller, a first input of which is connected to the output of the current traction device. The output of the changeover logic is connected to a bridge triggering module, while a second input of the changeover logic circuit is connected to a first output of a measurement signal generator. An input of the current detection module is connected to a third output of the priority controller. A first output of the priority controller is connected to a second input of the current specification module, while the second output of the priority controller is connected to an input of the measurement signal generator. A second output of the measurement signal generator is connected to a second input of the rotor position computer, and the calculated rotor position is made known to a super-imposed closed-loop controller and to the torque specifier from the output of the rotor position computer, via a line.

With the above-described circuit arrangement, the method steps listed above can be attained for a rotary field machine embodied as a synchronous machine.

According to another embodiment of the instant invention, a rotary field machine is embodied as a reluctance machine, in which feedback from measurement signals transferred to the reluctance machine is measured, wherein the measurement signals are voltage discontinuities generated by the inverter, which are either additionally inserted signals or signals that occur during its operation and are suitable for evaluation, and which effect current variations that are measured and delivered to a computer, which ascertains a complex parameter that is proportional (or inversely proportional) to the quotient of the stator voltage space vector and variations over time of the stator current space vector (which is hereinafter referred to as a complex parameter), in which the direction of the voltage space vector is derived from the known inverter trigger state to calculate the rotor position, wherein the complex parameter, because of different reactances in the longitudinal and transverse directions, fluctuates in an approximate sinusoidal fashion in both its real component and its imaginary component, with twice the value of the rotor position angle, and twice the value of the rotor position angle sought being ascertained by known methods of complex calculation from real and imaginary components.

The advantage of the method of the present invention over known methods resides in its application to the reluctance machine, in that no mechanical transducer is necessary, and, voltage measurements can be dispensed with. Additionally, no additional analog current source is needed. Instead, the already existing supplying inverter is used as the measurement signal transducer.

In the context of the present invention, a circuit arrangement is provided in which actual current values of the phases of the stator winding of the reluctance machine are taken from current measuring devices that are disposed between an inverter and a reluctance machine, and which are delivered to first inputs of a current detection module. A control output of a priority open-loop controller is connected to a control input of the current detection module, and an output of the current detection module is connected to a first input of both a current rise computer and a field orientation and current regulating module. The output of the current rise computer is connected to a first input of a rotor position computer, while the output of the rotor position computer is connected to a second input of the field orientation and current regulating module. The command torque or command magnetization is delivered, respectively, to a third and fourth input of the field orientation and current regulating module. The output of the field orientation and current regulating module is connected to a first input of a changeover logic circuit. An output of the timer unit is connected to a second input of the current rise computer. A third output of the priority controller is connected to both an input of an inverter trigger status former and to a second input of the rotor position computer. The output of the inverter trigger status former is connected to a second input of the changeover logic circuit, the changeover logic circuit being triggered by the priority controller. The output of the changeover logic circuit is connected to the input of a triggering module of the inverter.

With such a circuit arrangement, a rotary field machine embodied as a reluctance machine can easily be implemented for signal processors and microprocessors (or microcontrollers) that are available on the market.

The present invention utilizes the state of the art equations for determining complex quantities and for the modulation of inductance with double the rotor angle. That is, by utilizing and manipulating the state of the art equations, the features of the present invention will become more clear. In particular, the electromagnetic state "flux angular position" is obtained by using the new method of measuring the fluctuation of magnetic reactance as a function of flux angular position. This method works well even at zero flux speed and zero mechanical speed which was not possible before. All well-known methods use the back e.m.f. based on flux change per time which vanishes at low speed using these well-known methods. Furthermore, these well-known methods need phase voltage measurement. The method presented here does not use any phase voltage measurement.

First of all, the machine must have detectable inductance differences in space. This is the case if the machine has a salient construction like e.g., reluctance machines or if the machine has saturated parts due to permanent magnetization (or both properties at the same time). In this case, the new mentioned measuring strategy can directly be started independently of armature current level. However, in case the machine has no measurable inductance differences due to a "cylindric rotor" and no flux (hence, no saturation) as given in induction motor case, it is necessary to bring the motor into the desired magnetic set-point by appropriate magnetization.

To provide a magnetizing feature, the present invention recognizes that, due to saturation by means of armature current, detectable inductance differences in space are produced, which can be evaluated. This is done by applying a flux-producing current component to the motor. The magnetic flux which is produced by this current component can be found by the magnetization curve of the motor. The desired current is adjusted by well-known current control loops which use the inverter as a switching voltage source, forcing the current to increase or decrease. Obviously, the varying inductance (or more exactly, the space direction where its minimum value is located) is closely related to the flux axis of the machine. In case of machines with rotors rotating synchronously with flux angular speed as synchronous and reluctance machines, the flux axis is in a fixed angular relation to rotor position.

To provide for ascertaining a complex parameter, the present invention recognizes that the effect of varying inductance is detected by measuring the change of the current (space vector) applied to the motor phases, divided by a quantity proportional to the voltage space vector or vice versa (in order to save calculating time). The direction of the voltage space vector is very exactly defined by the inverter and can be 0, 60, 120, . . . degrees. The modulus of the voltage space vector has no influence on the flux axis calculation (DC link voltage sufficiently constant during the measuring procedure).

Thus, in accordance with the present invention, the basic measuring procedure is as follows. A constant voltage space vector is applied to the machine for a short time period (e.g., voltage space vector in phase axis A is achieved by switching the inverter branch connected to phase A to positive DC link potential and the other branches to negative potential). The time period is typically in the range of 10 to 1000 microseconds depending on the machine inductances and is chosen so as to detect the current change per time with the desired accuracy. On the other hand, the current change is limited to the maximum acceptable deviation of the current from its reference value. To get full current space phasor information, at least (N-1) phase currents are measured (N . . . number of phases) by well-known current measuring devices like e.g.. ohmic shunts or similar type devices.

Measuring the phase currents after having started applying the mentioned constant voltage space vector (delay time between voltage switching and current measurement eliminates problems associated with switching transients), storing them, measuring the currents again before the end of the constant voltage space vector and subtracting the second phase values from the first yields phase current changes. Combining these phase current changes using the basic space vector definition (e.g., machine with three phases A,B,C; arbitrary constant value const)

$$\Delta i = \text{const}(\Delta i_A + \Delta i_B \cdot \exp(j\ 120°) + \Delta i_A \cdot \exp(j\ 240°))$$

yields a complex quantity $\Delta i$. Due to the mentioned inductance differences in space, this complex quantity can be mathematically described by ($\Delta i_o$ . . . magnitude of the constant part of $\Delta i$; $\Delta i_{saliency}$ . . . magnitude of the variable part of $\Delta i$ which is usually considerably smaller than $\Delta i_o$; $\gamma_{ident}$ . . . angular position of minimum inductance which is to be identified; $\gamma_u$ . . . well-known angle of applied voltage space vector):

$$\Delta i = (\Delta i_o - \Delta i_{saliency} \cdot \exp\ j(2\gamma_{ident} - 2\gamma_u)) \cdot \exp\ j\gamma_u$$

To provide for the calculation of magnetic flux, the present invention recognizes that dividing $\Delta i$ by a quantity proportional to the mentioned space vector u (since the modulus of u is not needed for calculation of $\gamma_{ident}$, no voltage measurement is necessary) yields an equation for calculating $2\gamma_{ident}$ (x . . . complex parameter proportional to the quotient of stator voltage space vector and variation over time of stator current space vector; const . . . arbitrary constant quantity; const2, const3 . . . constant quantities depending on DC link voltage, not explicitly needed for calculation):

Defining $$y := \Delta i/(\text{const1} \cdot u) = x^{-1}$$

yields $$y = \Delta i/(\text{const2} \cdot \exp\ j\gamma_u) = \text{const3}(\Delta i_o - \Delta i_{saliency} \cdot \exp\ j(2\gamma_{ident} - 2\gamma_u)).$$

Changing the flux angular position quasi-continuously and repeating the described measuring procedure yields a sinusoidal fluctuation of both real and imaginary part of y with double the desired angle $\gamma_{ident}$. For constant DC link voltage and identified $\Delta i_o$ and $\Delta i_{saliency}$, $\gamma_{ident}$ can be calculated by basic mathematical operations from the above equation. The flux axis $\gamma_\psi$, (which is closely related to the rotor position $\gamma$ in the case of permanent magnet synchronous machines and reluctance machines) is calculated from $\gamma_{ident}$ by ($\gamma_{corr1}(i_{torq})$, $\gamma_{corr2}(i_{torq})$ . . . correcting angles, depending on torque-producing current component $i_{torq}$)

$$\gamma_\psi = \gamma_{ident} + \gamma_{corr1}(i_{torq})\ \text{(valid for induction motor, permanent magnet synchronous motor and reluctance motor)}$$

$$\gamma = \gamma_{ident} + \gamma_{corr2}(i_{torq})\ \text{(valid for permanent magnet synchronous and reluctance motor)}$$

The correction function $\gamma_{corr1}(i_{torq})$ is obtained by comparison of $\gamma_{ident}$ with $\gamma_\psi$ calculated by a classical flux model (voltage model, current model, . . . ) during a calibrating procedure. The correction function $\gamma_{corr2}(i_{torq})$ is obtained by comparison of $\gamma_{ident}$ with $\gamma$ measured by a position measuring device during a calibrating procedure. These calibrating procedures are done once per machine type at a test-stand and not during regular operation. The correction functions are stored in a look-up table or modeled by an approximating function or neglected.

The necessity of identifying $\Delta i_o$ and $\Delta i_{saliency}$ as stated above can be neglected by combining at least two measurement with different voltage space vectors. This yields a complex equation (or two real equations after splitting up in real and imaginary parts) from each measurement for calculating $\gamma_{ident}$. Hence, by well-known mathematical procedures, $\Delta i_o$ and $\Delta i_{saliency}$ can be eliminated. As an example, this technique is shown using two measurements (voltage space vectors $\gamma_{u1}$ and $\gamma_{u2}$, respectively, current changes $\Delta i_1$ and $\Delta I_2$):

The first measurement yields the complex quantity $y_1$, which is related to $\gamma_{ident}$ in the following way:

$$y_1 = \Delta i_1/(\text{const2} \cdot \exp\ j\gamma_{u1}) = \text{const3}(\Delta i_o - \Delta i_{saliency} \cdot \exp\ j(2\gamma_{ident} - 2\gamma_{u1}))$$

The second measurement yields $$y_2 = \Delta i_2/(\text{const2} \cdot \exp\ j\gamma_{u2}) = \text{const3}(\Delta i_o - \Delta i_{saliency} \cdot \exp\ j(2\gamma_{ident} - 2\gamma_{u2}))$$

Splitting up in real and imaginary parts yields four real equations ($y := y_{real} + j y_{imag}$):

$$y_{1real} = \text{const3}(\Delta i_o - \Delta i_{saliency} \cdot \cos(2\gamma_{ident} - 2\gamma_{u1}))$$

$$y_{1imag} = \text{const3}(-\Delta i_{saliency} \cdot \sin(2\gamma_{ident} - 2\gamma_{u1})).$$

$$y_{2real} = \text{const3}(\Delta i_o - \Delta i_{saliency} \cdot \cos(2\gamma_{ident} - 2\gamma_{u2}))$$

$$y_{2imag} = \text{const3}(-\Delta i_{saliency} \cdot \sin(2\gamma_{ident} - 2\gamma_{u2})).$$

Hence, $\gamma_{ident}$ can be calculated without explicitly knowing const3, $\Delta i_o$ and $\Delta i_{saliency}$.

Using three measurements with three different voltage space vector angles yields 6 real equations with a lot of possibilities of calculating $\gamma_{ident}$. Two special cases are using only the real part equations and using only the imaginary part equations, respectively.

With increasing flux angular speed, an error in detecting $\gamma_{ident}$ will occur due to the increasing e.m.f. influence. This e.m.f. influence is eliminated by using a second measurement (index II), in which the voltage space vector of the second measurement is different from the space vector of the first measurement (index I) (for instance, contrary direction of the voltage space vector of the first measurement: $u_{II} = -u_I$) or the zero voltage space vector ($u_{II} = 0$, which means inverter state "short circuit", all inverter branches at the same voltage level). The well-known voltage equations for cases I and II are (neglecting stator resistance voltage drop, furthermore both measurements within a short time interval so that the e.m.f. is the same in both measurements)

$$u_I = x \cdot \Delta i_I/\Delta t + u_{emf}$$

$$u_{II} = x \cdot \Delta i_{II}/\Delta t + u_{emf}$$

Subtracting both equations eliminates the e.m.f. The difference between the space vectors of voltage and current change per time take the place of the respective space vector variables in the individual measurements:

$$(u_I - u_{II}) = x \cdot (\Delta i_I/\Delta t - \Delta i_{II}/\Delta t)$$

Thus, in accordance with the present invention, the measuring procedure operates independently of e.m.f., and, therefore, of the speed of the machine.

The connection between the rotor position computer and the field orientation and current regulating module is carried via a dynamic reluctance motor model. The rpm (or load torque) is delivered and integrated from a first and second output, respectively, of the dynamic reluctance motor model via a first and second line, respectively, to one or more super-imposed closed-loop control circuits.

Hence the method of the invention can be integrated into a multiple-loop closed-loop control system. such as rpm and torque control systems.

BRIEF DESCRIPTION OF THE DRAWINGS

The foregoing and other objects. features and advantages of the invention will be apparent from the following more particular description of the preferred embodiments as illustrated in the accompanying drawings in which reference characters refer to the same parts throughout the various views. and wherein.

DETAILED DESCRIPTION OF THE EMBODIMENTS

The invention will now be described in further detail. referring to several exemplary embodiments. The principle of the invention is disclosed in FIG. 1 with an asynchronous machine. FIG. 2 with a synchronous machine. and in FIG. 3 with a reluctance machine.

The method of the present invention will be explained in detail with reference in FIG. 1. which illustrates a three-phase asynchronous machine. The principle of the present invention can be employed in the same way for asynchronous machines having a different number of phases.

FIG. 1 illustrates three leads 18, 19, 20 of a rotary current line. which are carried to a voltage intermediate-circuit inverter 1 that powers an asynchronous machine 2. Current measuring devices 3 are associated with the supply lines and are located between the voltage intermediate-circuit inverter 1 and the asynchronous machine 2. Using a current detection module (module that measures current) 4 and including a priority open-loop control (super-imposed control module) 5 that performs handles timing issues. the current measuring devices 3 provide an updated current space vector. which. using a timer unit 10. enables a current variation space vector to be ascertained by a current rise computer (module that calculates a current change over time) 6. This vector. together with voltage space vector direction information generated by the priority controller 5. is used by a flux angle computer (device that calculates a flux angular position) 8 to calculate a flux angle that is used by a field orientation and current regulating block (unit that provides a field-orientation and current control) 7. which has "command torque" and "command magnetization" inputs. for ascertaining the converter triggering state.

Moreover. the flux angle ascertained by the flux angle computer 8 can be integrated into super-imposed closed-loop control circuits (for instance. rpm and torque control circuits). The priority controller 5 decides whether inverter triggering. in the case where the flux angle determination algorithm is carried out. is accomplished in a changeover logic circuit (switching circuit) 9 of a voltage space vector former (module that provides an inverter switching state command) 11. or in the normal current regulating instance. by the field orientation and current regulating module 7.

According to the embodiment illustrated in FIG. 1. the output of the current detection module 4 delivers generally digitalized information (which is either phase current or stator-specific components of the current space vector) representing current space vector to the scanning moments. wherein the scanning moments are defined by a signal outputted from the priority controller 5 and input to the current detection module 4. The information output from the current detection module 4 determines the current variation space vector or the variables representing the latter. in the current rise computer 6 by means of a time interval delivered by the timer unit 10. that is controlled by a signal output from the priority controller 5. In the present invention. the priority controller 5 controls a measurement cycle in response to module 11 that provides an inverter switching state command. In response to a signal outputted from the priority controller 5 to the switching changeover logic circuit 9. the inverter switching state module 11 is connected to the inverter triggering module 12 of the inverter 1. The trigger status module (inverter switching state module) 11 is controlled by the priority controller 5 and produces measurement signals that are assigned directly by the inverter 1 to the voltage space vector connected to the asynchronous machine 2.

The voltage space vector information. along with a current variation space vector outputted from dynamic asynchronous motor module 13. is used to determine a flux angle in the flux angle module 8. The dynamic asynchronous motor model 13 is based upon a mathematical simulation of an asynchronous machine according to known methods. The dynamic asynchronous motor model 13 also simultaneously determines the rpm speed of the machine 2 on line 16 and a load torque on line 17. Then. the flux angle is used in the current regulating module 7 to calculate an operational inverter trigger status in accordance with known field oriented regulation rules by means of nominal torque values inputted via line 14 and flux value inputted via line 15. By utilizing actual current information output by the current detection module 4 and inputted to a second input of the current regulating module 7. an inverter-trigger status is output from the current regulating module 7 to a second input of the changeover logic circuit 9 to be supplied to the triggering module 12 of the inverter 1.

Since the total of the currents delivered to the asynchronous machine must be zero. one current measuring device 3 can be dispensed with.

FIG. 2 illustrates the present invention applied to a three-phase synchronous machine. However. the invention can be used with synchronous machines having different number of phases. As shown in FIG. 2. synchronous machine 102 is supplied via a voltage intermediate-circuit inverter 101 by three rotary current lines 114, 115, 116. in which the phase currents are detected by three current measuring devices 103. However. it is also sufficient for only two phase currents to be measured. since the total current must be zero.

A current detection module (module for measuring current flow) 104 is controlled by a priority controller 105 and furnishes the actual currents at the measuring moments. Together with command currents generated by a current specification module (module for calculating a current reference value) 107. the actual currents are processed in a current rise computer (device for calculating a current change over time) 106 and furnish a bridge trigger signal. The current specification module 107 receives its input values via line 113 from a torque specifier (not shown) and is controlled by a priority controller 105. During a measurement with test cycles. the priority controller 105 activates a measurement signal generator 108. which. via changeover logic circuit (switching circuit) 110. services the priority controller 105. and delivers the bridge trigger signal to a bridge triggering module (Module that generates an inverter firing signal) 111.

In this case, the bridge trigger signal generated by the current rise computer 106 becomes inoperative. A rotor position computer (module for calculating a rotor angular position) 109 uses actual currents furnished by the current detection module 104 and the alternating converter switching state furnished by the measurement signal generator 108 to calculate the rotor position, which is passed on to a torque specifier and to the priority closed-loop controllers, via line 112.

Thus, the current detection module 104 measures actual currents detected by the current measuring devices at moments which are predetermined by a digital signal inputted to the current detection module 104 from the priority controller 105. An output of the current detection module 104 represents actual currents (which are generally digitalized) either in the form of phase currents or in the form of stator-specific phase current-space vector components. The input of line (113) represents the operational nominal current value of a superimposed rpm or torque control/adjustment.

A digital control signal is inputted to current specification module 107 to instruct when a measurement procedure is taking place and an operational nominal current value is out of power. An output of the current specification module 107 represents a nominal current that is inputted to one input of the current traction device 106 to be compared to actual values in the current traction device 106 inputted to a second input of the current traction device 106 via the current detection module 104. By means of a current regulator, 3-bit inverter-trigger information is obtained from the difference of the comparison, and connected to the inverter triggering module via the changeover logic circuit 110 that is controlled by the priority controller 105.

Priority controller 105 generates the current measuring command that is supplied to the current detection module 104. Additionally, the priority controller 105 is connected to the measurement signal generator 108 and the current specification module 107.

The measurement signal generator 108 outputs a signal that is connected to a second input terminal of the inverter triggering module 111 via the changeover logic circuit 110, which, as noted above, is controlled by the priority controller 105. The rotor position module 109 receives inverter-trigger information (which represents a voltage space vector) that is output from the measurement signal generator 108 and an output of the current detection module 104 to calculate the actual rotor position, which is output on line 112.

The method of the invention will now be explained with reference to a three-phase reluctance machine illustrated in FIG. 3. However, the present invention can be applied to a reluctance machines having any number of phases.

FIG. 3 shows three leads 218, 219, 220 of a rotary current line which are carried to a voltage intermediate-circuit inverter 201 that powers reluctance machine 2. Current measuring devices 203 are provided in the supply lines between the voltage intermediate-circuit inverter 201 and a reluctance machine 202. With a current detection module 204 and including a priority open-loop control (superimposed control module) 205 that performs a timing operation, the current measuring devices 203 provide an updated current space vector. Using a timing unit 210, the current variation space vector is ascertained by a current rise computer (unit that calculates a current change over time) 206. This vector, together with the voltage space vector direction information generated by the priority controller 205, is used by a rotor position computer (unit for calculating a flux angular position) 208 to calculate the rotor position angle used by a field orientation and current regulating block 207, which has a "command torque" and "command magnetization" inputs, for ascertaining a converter triggering state.

Moreover, the rotor position angle ascertained by the rotor position computer 208 can be integrated into super-imposed closed-loop control circuits (for instance, rpm and torque control circuits). The priority controller 205 decides whether the inverter triggering, in the case where the rotor position angle determination algorithm according to the invention is carried out, is accomplished in a changeover logic circuit (switching unit) 209 of the voltage space vector former (module that provides an inverter switching state command) 211, or in the normal current regulating instance, by the field orientation and current regulating module 207.

Alternatively, the changeover device 209 and the voltage space vector former 211 can be replaced by a feedback circuit that transmits the actual triggering state to the rotor position computer 208. In this case, the output of the field orientation and current regulating module 207 serves as the input to the triggering module (module that generates an inverter firing signal) 212.

According to the embodiment of FIG. 3, an output signal of the current detection module 204 supplies generally digitalized information (either phase currents or stator-specific components of the voltage space) representing the current space vector of the scanning moments to the input of the current rise computer 206 and one input of the current regulating module 207, wherein scanning moments are defined by a digital signal output from the priority controller 205 and inputted to the current detection module 204. The information output by the current detection module 204 is used to determine a current variation space vector or representative variables thereof in the current rise computer 206 by means of a time interval that is supplied by the timer unit 210. The timer unit 210 is controlled by a signal outputted by the priority controller 205. A measurement cycle is controlled by the priority controller 205 using the inverter trigger status module 211, which is supplied, via the switching changeover logic circuit 209, to the inverter triggering module 212 of the inverter 201. The inverter trigger status module 211 produces measurement signals that are directly assigned to the asynchronous machine 202 by the inverter 201. The voltage space phase information (outputted by the priority controller 205 to the flux angle computer 208) and the signal exchanged between the current rise computer 206 and the flux angle computer 208 (which represents the current variation space), are optimally improved in a dynamic reluctance model 213 by mathematically simulating a reluctance machine in accordance with known methods. The dynamic reluctance model produces a flux angle signal that is supplied to one input of the current regulating module 207.

In accordance with the simulation, the reluctance motor model 213 also outputs a signal representing the rpm of the machine on line 216 and a signal representing the load torque on line 217. The flux angle signal, and the actual current information outputted from the current detection module 204 and inputted to a second input of the current regulating module 207, is used by the current regulating module 207 to calculate the operational inverter trigger status as per known rules of field oriented regulations using nominal rpm values inputted via line 214 and flux values inputted via line 215. The inverter trigger status is then transmitted to the triggering module 212 of the inverter 201 via the changeover logic circuit 209, the operation of which is controlled by the priority controller 205.

Finally, since the total of the currents delivered to the reluctance machine is always zero, one current measuring device 203 can be dispensed with.

We claim:

1. A method for obtaining electromagnetic and mechanical status information pertaining to an operation of a machine comprising:

detecting an inductance difference in the machine;

when the inductance difference is not detected, magnetizing the machine to produce the inductance difference prior to obtaining the electromagnetic and mechanical status information;

producing a measurement signal representing voltage discontinuities generated by an inverter associated with the machine; and measuring a current variation to ascertain a complex parameter proportional to a quotient of a stator voltage space vector and a variation over time of a stator current space vector, a direction of the stator voltage space vector being derived from a known inverter trigger state to calculate a magnetic flux of the machine, the complex parameter fluctuating in an approximate sinusoidal fashion in both a real component and an imaginary component with twice a value of a magnetic flux angle.

2. The method of claim 1, further comprising repeating the measuring step and the producing step a plurality of times using different voltage space vector directions to ascertain a plurality of complex parameters.

3. The method of claim 1, wherein ascertaining the flux angle comprises subtracting two current rise measurements to obtain a measured difference, in which the same voltage space vector is present in both partial measurements, and the stator current space vectors, which are located at a mean during both partial measurements, differ so that a stray inductance is perceptibly different, a measured difference between the two stator current space vectors representing a complex vector whose real and imaginary components oscillate at a flux space vector circumferential speed.

4. The method of claim 1, further comprising combining a plurality of measurements corresponding in number to a number of phases of the machine, the measurements being carried out in different space vector directions and being combined to make new complex parameters, so as to minimize a flux axis error.

5. The method of claim 1, wherein a voltage space vector of a second measurement either is contrary to the voltage space vector of the first measurement or is the zero voltage space vector, a difference between the space vectors take the place of corresponding space vector variables in individual measurements.

6. The method of claim 1, further comprising obtaining two measurements, a stator voltage space vector of the second measurement being an arbitrary voltage space vector which is not identical to the stator voltage space vector of the first measurement.

7. The method of claim 1, wherein the machine comprises an asynchronous machine, an EMF being calculated from instantaneous estimated values of the magnetic flux and its derivation over time.

8. The method of claim 1, further comprising obtaining two pairs of measurements that are combined within a predetermined time interval as long as a voltage difference space vector of the two pairs of measurements have different arguments, the complex parameter being formed from each pair of measurements along with a difference of the two complex parameters.

9. The method of claim 1, comprising determining a beginning and an end of a measurement interval, associated current values being measured during the measurement interval.

10. The method of claim 1, comprising using the magnetic flux to impress a desired flux-forming current component in a direction of the ascertained magnetic flux to define a magnetization of the machine, a desired torque-forming current component normal thereto being impressed to define a torque to be developed by the machine.

11. The method of claim 1, further comprising ascertaining a rotary field speed and a flux space vector.

12. The method of claim 1, wherein the machine comprises a synchronous machine, a rotor position of the synchronous machine being determined using a complex calculation.

13. The method of claims 12, further comprising combining a plurality of measurements corresponding in number to the number of phases of the machine, the plurality of measurements being performed in different space vector directions.

14. The method of claim 13, further comprising eliminating an influence of an induced voltage.

15. The method of claim 12, further comprising correcting offsets dependent on a voltage, a current, an rpm and a flux amount of the machine using correction values.

16. The method of claim 1, further comprising taking into account the influence of an armature current of the machine in determining a rotor position of the machine.

17. The method of claim 16, further wherein the rotor position is obtained by integrating a voltage model of a stator voltage equation.

18. The method of claim 1, wherein the machine comprises a reluctance machine, and further comprising repeating the measuring step with a different stator voltage space vector direction, with preferably the same number of winding phases.

19. The method of claim 1, further comprising calculating a voltage caused by a rotor rotation of the machine from an instantaneous estimated value of the magnetic flux and its derivation over time.

20. The method of claim 9, further comprising selecting the measurement interval such that a current rise measurement and a current fall measurement are located symmetrically with a current operating point.

21. The method of claim 1, further comprising obtaining rotor position information of the machine, the obtained rotor position being combined with a known voltage model for a reluctance machine.

22. The method of claim 21, comprising using the rotor information to impress a desired flux-forming current component in a direction of a longitudinal axis to define a magnetization of the machine, and normal thereto to impress a transverse current component necessary to define a torque developed by the machine.

23. The method of claim 1, wherein the machine comprises a motor having a magnet-field-excited element, and further comprising taking into account an influence of the magnet-field-excited element.

24. An apparatus for obtaining, independently of a machine speed and a machine position, electromagnetic and mechanical information pertaining to an operation of a machine, comprising:

an inverter that powers said machine;

a current detection module that detects a current supplied to the machine by the inverter; and a mathematical model that is combined with a measuring procedure that uses electrical quantities determined independently of the machine speed and the machine position for determining a flux position, an rpm and a load torque of a motor of the machine, the mathematical model simulating the machine in accordance with only the detected current.

25. The apparatus of claim 24, wherein said machine comprises an asynchronous machine.

26. The apparatus of claim 24, wherein said machine comprises a synchronous machine.

27. The apparatus of claim 24, wherein said machine comprises a reluctance machine.

* * * * *

UNITED STATES PATENT AND TRADEMARK OFFICE
CERTIFICATE OF CORRECTION

PATENT NO.  : 5,796,235
DATED       : August 18, 1998
INVENTOR(S) : M. SCHRÖDL et al.

It is certified that error appears in the above-identified patent and that said Letters Patent is hereby corrected as shown below:

On the cover page
       [63], delete in its entirety and insert therefor:  ---Continuation of Ser. No. 129,118, filed Apr. 8, 1992, now abandoned, which is a U.S. National Stage of PCT/AT92/0049, filed April 8, 1992---.

At column 1, lines 8 and 9
       delete in their entirety and insert therefor:  ---Continuation of Ser. No. 129,118, filed apr. 8, 1992, now abandoned, which is a U.S. National Stage of PCT/AT92/00049, filed Apr. 8, 1992---.

Signed and Sealed this

Fourth Day of April, 2000

Attest:

Attesting Officer

Q. TODD DICKINSON

Director of Patents and Trademarks